US009076997B2

(12) United States Patent
Hirata

(10) Patent No.: US 9,076,997 B2
(45) Date of Patent: Jul. 7, 2015

(54) FLEXIBLE CIRCUIT BOARD AND METHOD FOR MANUFACTURING THE SAME, AND FUEL CELL USING THE FLEXIBLE CIRCUIT BOARD

(75) Inventor: Masanori Hirata, Ushiku (JP)

(73) Assignee: NIPPON MEKTRON, LTD, Tokyo-To (JP)

(*) Notice: Subject to any disclaimer, the term of this patent is extended or adjusted under 35 U.S.C. 154(b) by 34 days.

(21) Appl. No.: 13/697,151

(22) PCT Filed: Feb. 3, 2012

(86) PCT No.: PCT/JP2012/052508
§ 371 (c)(1),
(2), (4) Date: Nov. 9, 2012

(87) PCT Pub. No.: WO2012/176488
PCT Pub. Date: Dec. 27, 2012

(65) Prior Publication Data
US 2013/0202985 A1    Aug. 8, 2013

(30) Foreign Application Priority Data
Jun. 23, 2011  (JP) ................................. 2011-139589

(51) Int. Cl.
H01M 2/38      (2006.01)
H01M 8/02      (2006.01)
H01M 8/10      (2006.01)

(52) U.S. Cl.
CPC .......... H01M 8/0269 (2013.01); H01M 8/0276 (2013.01); H01M 8/0271 (2013.01); H01M 8/1011 (2013.01); H01M 8/0206 (2013.01); H01M 8/0228 (2013.01); Y02E 60/50 (2013.01)

(58) Field of Classification Search
CPC ............ H01M 8/0206; H01M 8/0228; H01M 8/0269; H01M 8/1011; H01M 8/0271; H01M 8/0276; Y02E 60/50

USPC ......... 429/452, 456, 457, 458, 463, 471, 512, 429/513, 514, 517, 518, 522
See application file for complete search history.

(56) References Cited

U.S. PATENT DOCUMENTS

| 2005/0026028 | A1  |  2/2005 | Ouchi et al. |         |
|--------------|-----|---------|--------------|---------|
| 2006/0292435 | A1* | 12/2006 | Liu et al.   | 429/44  |
| 2009/0092878 | A1* |  4/2009 | Seido et al. | 429/30  |
| 2010/0040924 | A1* |  2/2010 | Niroumand    | 429/26  |

(Continued)

FOREIGN PATENT DOCUMENTS

| CN | 1516904 A | 7/2004 |
| CN | 1516907 A | 7/2004 |

(Continued)

OTHER PUBLICATIONS

Office Action of Jul. 3, 2014 issued to the corresponding Chinese patent application.
Search Report of Mar. 19, 2015 issued to the corresponding European patent application.

Primary Examiner — Patrick Ryan
Assistant Examiner — Ben Lewis
(74) Attorney, Agent, or Firm — Jacobson Holman, PLLC

(57) ABSTRACT

There is provided a flexible circuit board capable of preventing corrosion and elution of a conductor layer constituting a current collector even under high-temperature and high-voltage working conditions while achieving sufficient electric connection with an MEA. A flexible circuit board having a current collector of a fuel cell provided thereon includes an insulating flexible base material 1, a plurality of openings 5 that supply fuel or air, the openings 5 being provided in a specified region so as to penetrate through the flexible base material 1 in a thickness direction, a plating film 6 that constitutes the current collector, the plating film 6 being formed on front and back surfaces of the flexible base material 1 in the specified region and on inner walls of the openings 5, a surface treatment film 9 formed on the plating film 6 and having corrosion resistance higher than that of the plating film.

8 Claims, 9 Drawing Sheets

(56) References Cited

FOREIGN PATENT DOCUMENTS

| | | | |
|---|---|---|---|
| EP | 2328393 | A1 | 6/2011 |
| JP | 2004-200064 | | 7/2004 |
| JP | 2008-270420 | | 11/2008 |
| JP | 2010-050378 | | 3/2010 |

* cited by examiner

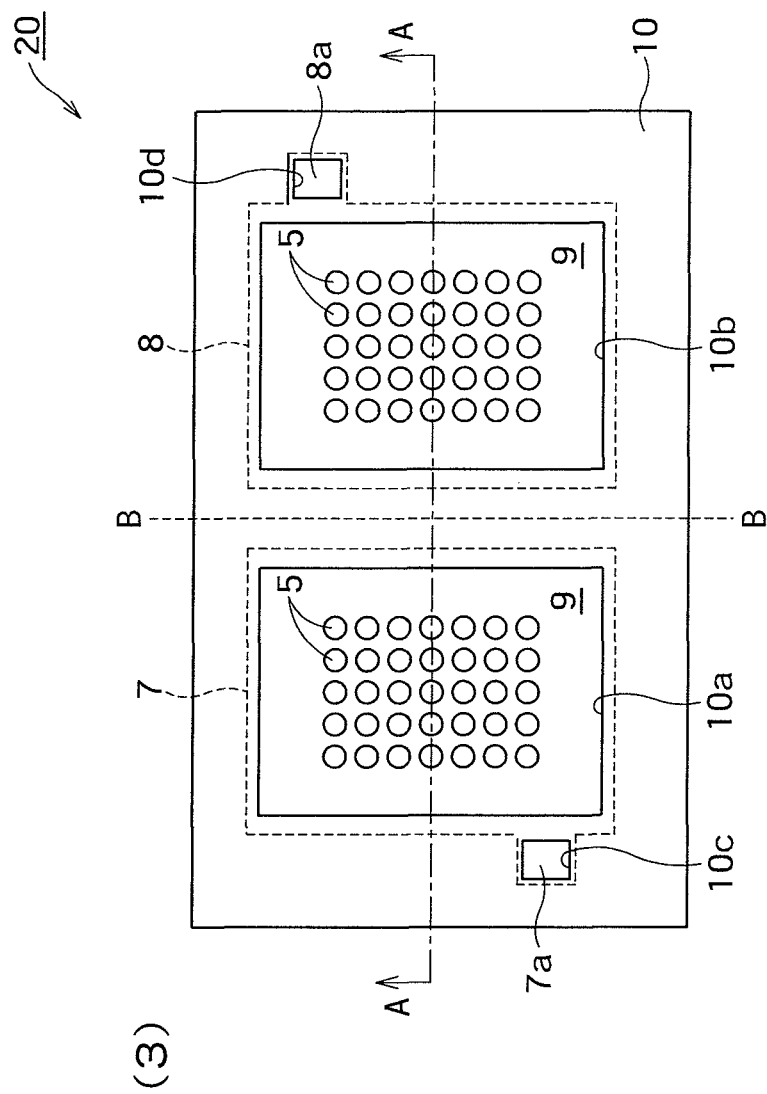

FLEXIBLE CIRCUIT BOARD AND METHOD FOR MANUFACTURING THE SAME, AND FUEL CELL USING THE FLEXIBLE CIRCUIT BOARD

This is a national stage of PCT/JP12/052508 filed Feb. 3, 2012 and published in Japanese, which claims the priority of Japanese number 2011-139589 filed Jun. 23, 2011, hereby incorporated by reference.

TECHNICAL FIELD

The present invention relates to a flexible circuit board, more particularly to a flexible circuit board for use as a current collecting plate of a fuel cell and a method for manufacturing the same, and a fuel cell using the flexible circuit board.

BACKGROUND ART

In recent years, lithium ion batteries which are light-weighted and high capacity are mainly used as a power source of electronic equipment represented by cellular phones, personal computers and the like.

However, increase in power consumption relating to development of the electronic equipment with higher performance is causing problems of (1) inability to secure sufficient electric power, (2) shortened continuous operating time even with necessary electric power secured, and (3) a long charging time being required.

Under these circumstances, fuel cells are attracting attention as a power source which replaces the lithium ion batteries. Particularly, Direct Methanol Fuel Cells (DMFCs) which use methanol as fuel are regarded as promising. The DMFCs have a Membrane Electrode Assembly (MEA) constituted of a fuel electrode, an air electrode, and an electrolyte membrane for supplying methanol water solution to the fuel electrode while supplying air to the air electrode. The methanol supplied to the fuel electrode is decomposed by a catalyst and hydrogen ions are created. The hydrogen ions pass through the electrolyte membrane and react with oxygen existing in the air at the air electrode. The DMFCs generate electric power through a series of these reactions.

Since the DMFCs can provide high-density energy as compared with the lithium ion batteries, they can cope with the increased power consumption of the electronic equipment. Moreover, preparing reserve fuels for the DMFCs allows continuous use of the electronic equipment without the necessity of a long charging time as in the lithium ion batteries. Further, since the DMFCs do not need devices such as a reformer which produces hydrogen, reduction in size and weight of the DMFCs is possible, which is regarded as one of the advantages of the DMFCs over other fuel cells.

One of the members constituting the DMFC is a current collecting plate. In order to achieve smaller and lighter fuel cells, a flexible circuit board is used as a current collecting plate (see, e.g., Patent Literature 1). In the flexible circuit board, a conductor layer constituting a current collector is formed on one side of a flexible base material which is made of polyimide and the like. The current collector has openings provided for supplying methanol or air to the MEA.

In order to maintain characteristics such as an output voltage of the fuel cell, the current collector is required to have corrosion resistance against methanol and intermediate products, such as formic acid, which are created in the process of decomposing the methanol. Accordingly, Patent Literature 2 discloses a flexible circuit board in which a conductor layer as a current collector is coated with a carbon containing layer. The carbon containing layer is made of a resin composition containing carbons such as carbon black in a resin material such as polyimide.

CITATION LIST

Patent Literature

Patent Literature 1: Japanese Patent Laid-Open No. 2004-200064
Patent Literature 2: Japanese Patent Laid-Open No. 2010-050378

SUMMARY OF INVENTION

Technical Problem

However, since the carbon containing layer is higher in resistance than the conductor layer made of metals such as copper, the current collector coated with the carbon containing layer unfortunately gains a higher conduction resistance value. There is also a possibility that resin materials used as binders may dissolve under high-temperature working conditions.

Further, even when the conductor layer is coated with a coating layer such as the carbon containing layer, metals constituting the conductor layer may be eluted due to corrosion through an interface between the flexible base material and the coating layer particularly in the case where a plurality of cells are connected in series to output high voltage. This problem will be explained with reference to FIGS. 6 (1) and 6 (2).

FIG. 6 (1) shows a cross sectional view of a conventional flexible circuit board 100 with current collectors of a fuel cell provided thereon. In the flexible circuit board 100, a conductor layer 102 constituting current collectors is formed on one side of a flexible base material 101 made of polyimide and the like. The conductor layer 102 is made of copper and the like. A coating layer (such as the above-mentioned carbon containing layer) 103 is formed so as to coat the conductor layer 102. The flexible circuit board 100 has openings 104 formed for supplying methanol and has openings 105 formed for supplying air.

As shown in FIG. 6 (1), the coating layer 103 coats the conductor layer 102, so that the conductor layer 102 is not exposed to the outside. However, in an interface S between the coating layer 103 and the flexible base material 101, the coating layer 103 and the flexible base material 101 are only in contact with each other and do not adhere to each other. Accordingly, while the flexible circuit board 100 is used as a current collecting plate of a fuel cell, methanol and acid that is an intermediate product thereof enter into the inside of the flexible circuit board 100 along through the interface S. Consequently, corrosion and elution of the conductor layer 102 progress. As a result, as shown in FIG. 6 (2), a lateral surface of the conductor layer 102 is chipped, which puts a lateral surface portion of the coating layer 103 into a floating state. Although a mechanism of the corrosion process is not clarified so far, it can be estimated that the corrosion is attributed to galvanic corrosion (electrolytic corrosion) resulting from a local potential difference generated in the vicinity of the interface S.

Thus, under high voltage conditions in particular, local corrosion starting from the interface S progresses. Accordingly, providing the coating layer 103 cannot prevent corrosion and elution of the conductor layer 102.

It is to be noted that the coating layer 103 may be constituted from plated metal, plated onto the conductor layer 102, instead of the carbon containing layer, the plated metal (e.g., gold) having an ionization tendency smaller than that of copper which constitutes the conductor layer 102. However, as in the case of Patent Literature 2, adhesive force at the interface between the plating layer and the flexible base material is weak, which makes it impossible to avoid progress of corrosion from the interface.

Accordingly, an object of the present invention is to provide a flexible circuit board capable of preventing corrosion and elution of a conductor layer constituting a current collector even under high-temperature and high-voltage working conditions while achieving sufficient electric connection with an MEA, and a method for manufacturing the same, and to provide a fuel cell using the flexible circuit board.

Solution to Problem

A flexible circuit board according to one aspect of the present invention is a flexible circuit board having a current collector of a fuel cell provided thereon, including: an insulating flexible base material; a plurality of openings that supply fuel or air, the openings being provided in a specified region so as to penetrate through the flexible base material in a thickness direction; a conductor layer that constitutes the current collector, the conductor layer being formed on a front surface and a back surface of the flexible base material in the specified region and on inner walls of the plurality of openings; and a conductive surface treatment film formed on top of the conductor layer, the conductive surface treatment film having corrosion resistance higher than that of the conductor layer.

A fuel cell in one aspect of the present invention includes a Membrane Electrode Assembly (MEA) constituted of an electrolyte membrane, a fuel electrode bonded to one surface of the electrolyte membrane, and an air electrode bonded to the other surface of the electrolyte membrane; and a flexible circuit board according to the present invention, the flexible circuit board being disposed so that the current collector is in contact with the fuel electrode or the air electrode.

A method for manufacturing a flexible circuit board according to one aspect of the present invention includes: preparing a double-sided metal clad laminate, the double-sided metal clad laminate having an insulating flexible base material and first and second metallic foils provided respectively on both sides of the flexible base material; forming a plurality of openings in a current collector formation expected region on the double-sided metal clad laminate, the openings penetrating through the double-sided metal clad laminate in a thickness direction; forming a plating film on top of the first and second metallic foils and on inner walls of the openings by applying plating treatment to the double-sided metal clad laminate having the openings formed thereon; forming a current collector by patterning the first and second metallic foils and the plating film by etching; and forming a surface treatment film on top of the plating film by applying plating treatment to the double-sided metal clad laminate having the current collector formed thereon, the surface treatment film having corrosion resistance higher than that of the plating film.

A method for manufacturing a flexible circuit board according to one aspect of the present invention includes: preparing an insulating flexible base material; forming a plurality of openings in a current collector formation expected region on the flexible base material, the openings penetrating through the flexible base material in a thickness direction; forming a plating resist on a front surface and a back surface of the flexible base material, the plating resist having openings in the current collector formation expected region; forming a plating film on top of the flexible base material and on inner walls of the plurality of openings which are not coated with the plating resist by applying plating treatment to the flexible base material having the plating resist formed thereon; and forming a surface treatment film on top of the plating film by peeling off the plating resist and then applying plating treatment to the flexible base material having the plating film formed thereon, the surface treatment film having corrosion resistance higher than that of the plating film.

Advantageous Effects of Invention

In the flexible circuit board according to the present invention, the conductor layer constituting the current collector is formed on both sides of the flexible base material and on the inner walls of the openings. On top of the conductor layer, a surface treatment film made of a conductive material is formed, the surface treatment film having corrosion resistance higher than that of the conductor layer. In short, the portions of the current collector, which come into contact with methanol and acid that are fuel and intermediate products thereof, are all coated with the surface treatment film. There is no interface between the coating layer that protects the conductor layer and the flexible base material unlike in the conventional cases. Accordingly, when the flexible circuit board according to the present invention is used as a current collecting plate of the fuel cell, corrosion and elution of the conductor layer can be prevented even under high-temperature and high-voltage working conditions. As a result, it becomes possible to provide a fuel cell having stabilized characteristics such as an output voltage.

BRIEF DESCRIPTION OF DRAWINGS

FIG. 2B is a main process plan view subsequent to FIG. 2A for explaining the method for manufacturing the flexible circuit board according to the first embodiment of the present invention.

DESCRIPTION OF EMBODIMENTS

Hereinbelow, three embodiments of the present invention will be described with reference to the accompanying drawings. First and second embodiments relate to a flexible circuit board for use as a current collecting plate of a fuel cell and a method for manufacturing the same, and a third embodiment relates to a Direct Methanol Fuel Cell (DMFC) using the flexible circuit board of the present invention.

It is to be noted that like component members having like functions are designated by like reference signs in each drawings. Detailed descriptions of the component members with like reference sings are not to be repeated. The drawings are merely exemplary representations, in which thickness and plane size of each component members are suitably changed.
(First Embodiment)

A method for manufacturing a flexible circuit board according to the first embodiment of the present invention will be described using the cross sectional process views shown in FIGS. 1A and 1B, and the main process plan views shown in FIGS. 2A and 2B.

Figure 1A:
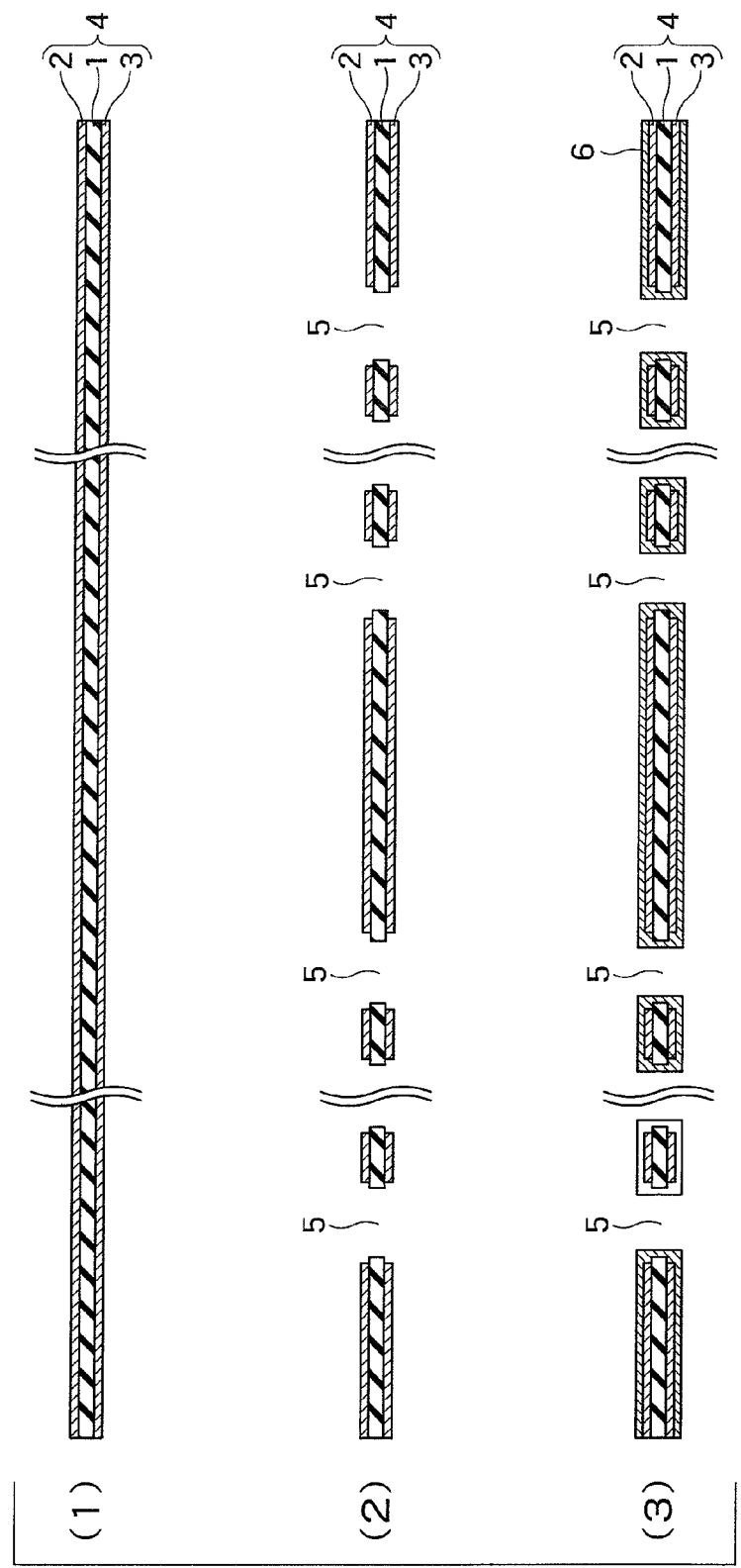
FIG. 1A is a cross sectional process view for explaining a method for manufacturing a flexible circuit board according to a first embodiment of the present invention.

(1) First, as shown in FIG. 1A (1), a double-sided copper clad laminate 4 is prepared. The double-sided copper clad laminate 4 has a flexible base material 1, and a copper foil 2 and a copper foil 3 which are provided on both sides of the flexible base material 1, respectively. The flexible base material 1 is an insulating base material having flexibility, which may be formed from resin films made of, for example, polyethylene terephthalate (PET) and polyethylene naphthalate (PEN).

Used as the double-sided copper clad laminate 4 in this embodiment is a 25 μm—thick polyimide film provided with 12 μm—thick copper foils on both sides thereof, respectively. It is to be noted that the laminate to be used may be a double-sided metal clad laminate having metallic foils which are made of a metal (nickel, aluminum, etc.,) other than copper and which are provided on both sides of the flexible base material 1. It is also possible to use a flexible circuit board having interconnections formed by printing a conductive paste such as silver pastes on both sides of the flexible base material 1.

(2) Next, as shown in FIGS. 1A (2) and 2A (1), a plurality of openings 5, which penetrate through the double-sided copper clad laminate 4 in the thickness direction, are formed in a current collector formation expected region C on the double-sided copper clad laminate 4.

Figure 2A:
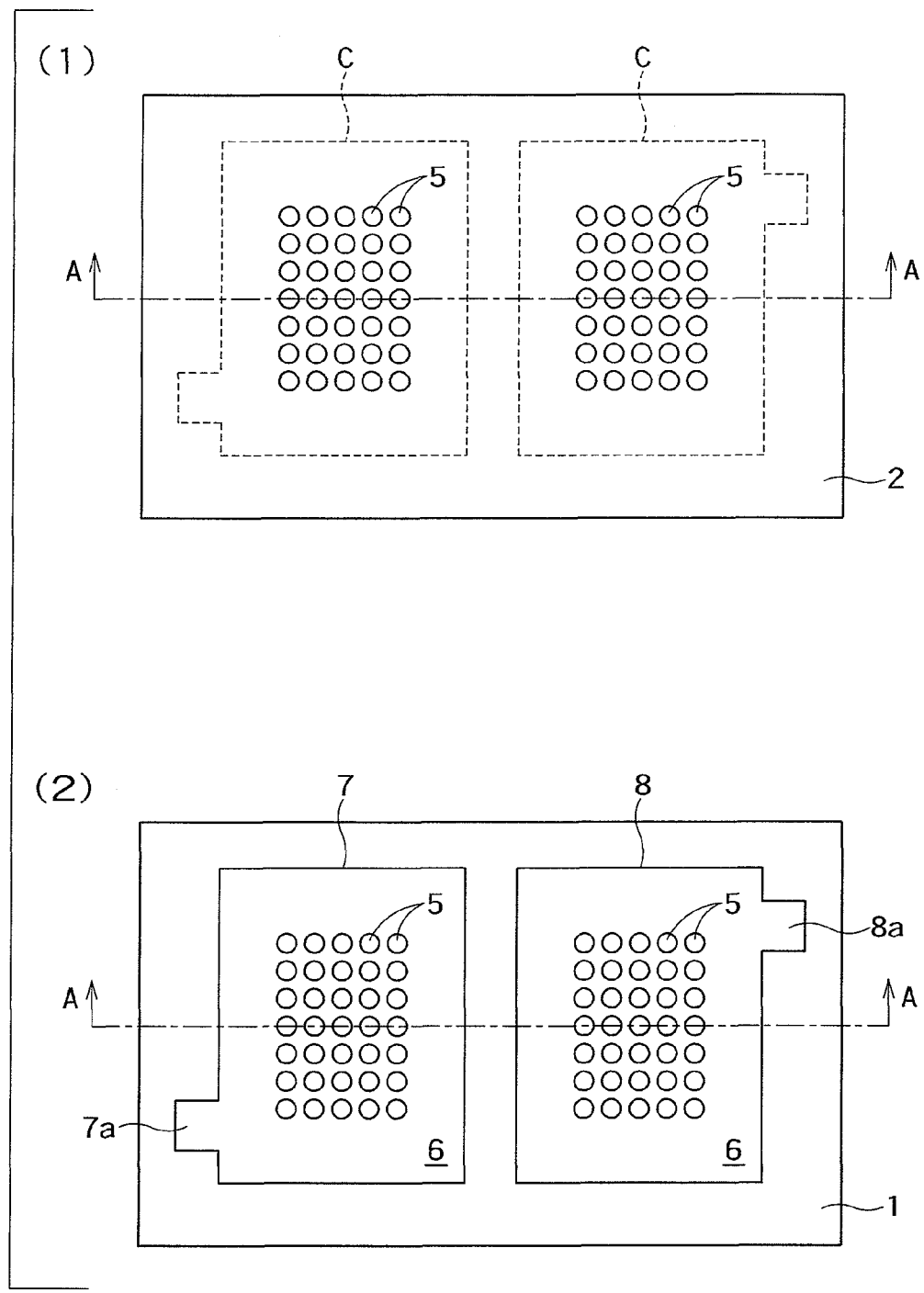
FIG. 2A is a main process plan view for explaining the method for manufacturing the flexible circuit board according to the first embodiment of the present invention.

In this embodiment, as shown in FIG. 2A (1), a plurality of openings 5 (with a hole diameter of 500 μm and a hole pitch of 600 μm for example) are formed in a mesh state.

It is to be noted that the openings 5 are formed by laser machining with high machining accuracy with use of carbon dioxide lasers, ultraviolet lasers or the like. Preferably, the ultraviolet laser is used in consideration of an influence of a heat history and workability of the openings. In other cases where the hole diameter and hole pitch of the openings 5 are large and therefore high machining accuracy is not required, the openings 5 may be formed by drilling or punching.

In the case of using laser machining, desmear treatment is performed after laser machining since the flexible base material 1 may sag due to heat during laser machining. Accordingly, the throwing power in plating the copper foils 2 and 3 is prevented from deterioration. It is to be noted that the copper foils 2 and 3 are receded in FIG. 1A (2) due to wet etching performed in the desmear treatment.

(3) Next, as shown in FIG. 1A (3), plating treatment is applied to the entire surface of the double-sided copper clad laminate 4 having the openings 5 formed therein. As a result, a plating film 6 is formed on top of the copper foil 2 and the copper foil 3 and on the inner walls of the openings 5.

In this embodiment, electroless copper plating (or electro-conductive treatment and the like) followed by electrolytic copper plating treatment are performed to form a 5 μm—thick copper plating film as the plating film 6. It is to be noted that the plating type is not limited to the copper plating. For example, nickel plating and silver plating may also be used.

Figure 1B:
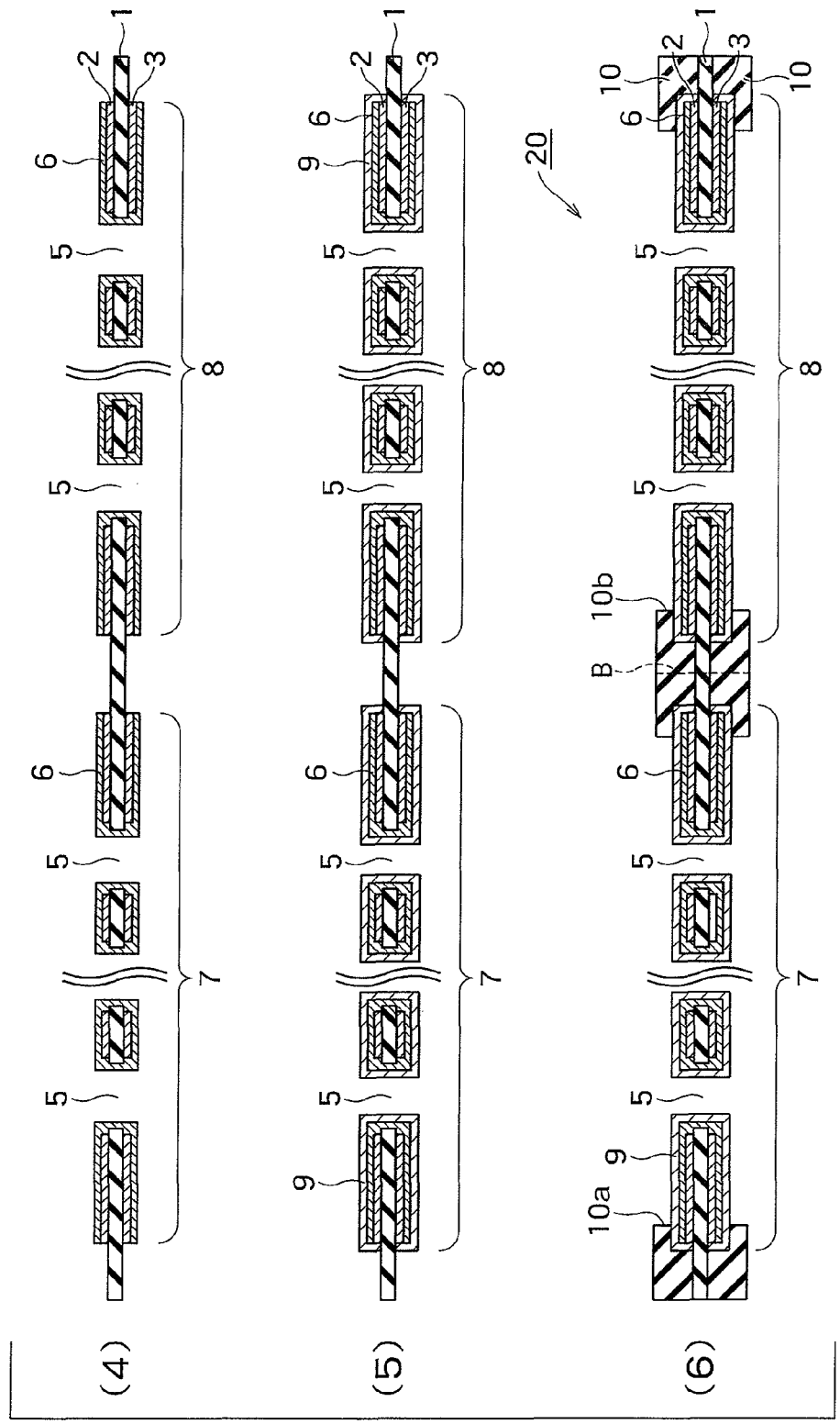
FIG. 1B is a cross sectional process view subsequent to FIG. 1A for explaining the method for manufacturing the flexible circuit board according to the first embodiment of the present invention.

(4) Next, as shown in FIGS. 1B (4) and 2A (2), the copper foils 2, 3 and the plating film 6 are patterned by etching so that current collectors 7 and 8 are formed. The current collector 7 is an anode-side current collector, while the current collector 8 is a cathode-side current collector. There are also formed an extraction electrode 7a and an extraction electrode 8a each extending from the current collector 7 and the current collector 8 along with the flexible base material 1.

Here, the plating film 6 (copper plating film) and the copper foils 2 and 3 are patterned by a general photofabrication method.

(5) Next, as shown in FIG. 1B (5), plating treatment is applied to the entire surface of the double-sided copper clad laminate 4 having the current collectors 7 and 8 formed thereon. Consequently, a surface treatment film 9 having corrosion resistance higher than that of the plating film 6 is formed on the plating film 6.

In this embodiment, the copper plating film is nickel-plated to make a base and is gold-plated to have high corrosion resistance. As a result, a nickel/gold (Ni/Au) plating film composed of a nickel-plating film with a thickness of 5 μm and a gold plating film with a thickness of 1 μm are formed as the surface treatment film 9. There is no particular restriction on the nickel plating and gold plating methods, and therefore electrolysis plating treatment, electroless plating treatment and the like may be used. It is also possible to directly apply gold plating without performing nickel plating.

It is to be noted that the surface treatment film 9 may be made of gold (Au), platinum (Pt), or titanium (Ti) for example.

The surface treatment film 9 may also be formed by applying to the plating film 6 a coating liquid containing: a metallic compound having at least one platinum metal selected out of iridium (Ir), ruthenium (Ru), rhodium (Rh), palladium (Pd), and platinum (Pt); and an organic solvent, and then drying and calcining the applied coating liquid.

(6) Next, as shown in FIGS. 1B (6) and 2B (3), an insulating layer 10 (with a 20 μm thickness for example) is formed so as to coat peripheral edge portions of the current collectors 7 and 8 across a boundary between the current collectors 7 and 8.

The insulating layer 10 has openings 10a and 10b provided so that a region where a plurality of the openings 5 are formed in a mesh state is exposed to the bottom surface. The insulating layer 10 also has openings 10c and 10d provided so that the extraction electrodes 7a and 8a are exposed to the bottom surface.

The insulating layer 10 may be formed by laminating a cover lay, which is composed of a resin film made of polyimide and the like and an adhesive layer provided on one side of the resin film, or by printing a resin ink made of polyimide and the like. The insulating layer 10 may also be formed with use of photo solder resists.

Since the insulating layer 10 is formed across the boundary between the current collectors 7 and 8, it becomes possible to protect the interface between the surface treatment film 9 and the flexible base material 1.

After the insulating layer 10 is formed, shape processing is performed. As a result, a flexible circuit board 20 applied to the current collecting plate of a fuel cell is obtained. The flexible circuit board 20 includes: an insulating flexible base material 1; a plurality of openings 5 that supply fuel or air, the openings 5 being provided in a specified region (current collector foaming region) so as to penetrate through the flexible base material 1 in a thickness direction; a plating film (conductor layer) 6 that constitutes the current collectors 7 and 8, the plating film 6 being formed on a front surface and a back surface of the flexible base material 1 in the specified region and on inner walls of a plurality of the openings 5; and a conductive surface treatment film 9 formed on the plating film 6, the surface treatment film 9 having corrosion resistance higher than that of the plating film 6.

It is to be noted that a folding line B shown in FIGS. 1B (6) and 2B (3) will be described later in detail in the third embodiment. In the process of fabricating a fuel cell, the flexible circuit board 20 is folded along the folding B so that an MEA is held therein.

As explained above, in the flexible circuit board 20 according to the present embodiment, the portions of the current collectors 7 and 8, which come into contact with methanol and acid as an intermediate product thereof, are all coated with the surface treatment film 9. That is, in the portions that come into contact with methanol and acid as an intermediate product thereof, there is no interface between the coating layer that protects the conductor layer and the flexible base material unlike in the conventional cases. Accordingly, corrosion and elution of the plating film 6 can be prevented even under high-temperature and high-voltage working conditions.

Further, since the surface treatment film 9 is made of a conductive metal or a conductive metal oxide, it becomes possible to sufficiently secure electric connection with the MEAs.

(Second Embodiment)

Next, a method for manufacturing a flexible circuit board according to the second embodiment of the present invention will be described using the cross sectional process views shown in FIGS. 3A and 3B. One of the differences between the second embodiment and the first embodiment is that the starting material in the second embodiment is not a double-sided copper clad laminate but a flexible base material. Hereinafter, a description will mainly be given of a part different from the first embodiment.

Figure 3A:
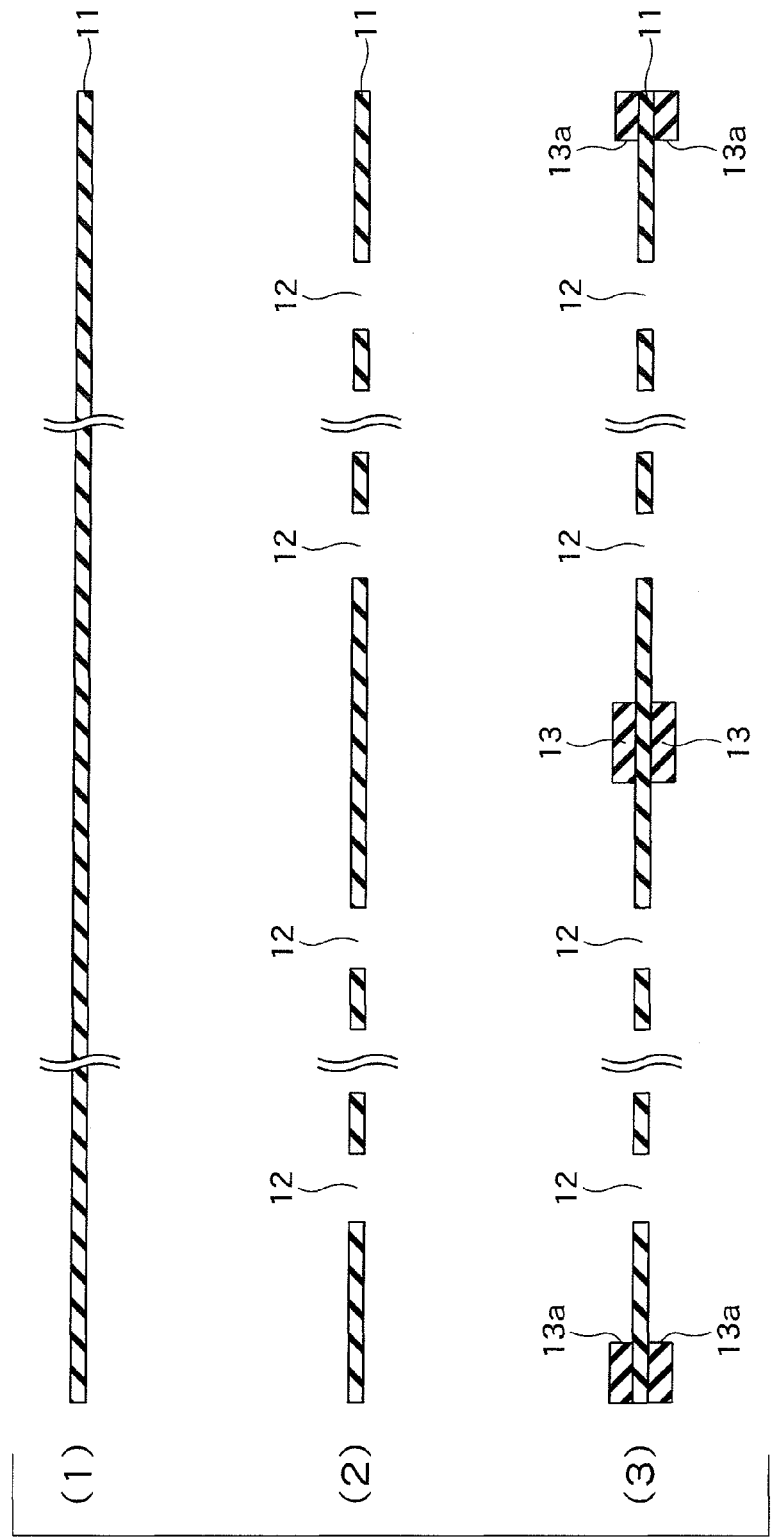
FIG. 3A is a cross sectional process view for explaining a method for manufacturing a flexible circuit board according to a second embodiment of the present invention.

(1) First, as shown in FIG. 3A (1), an insulating flexible base material 11 is prepared. In this embodiment, a polyimide film with a thickness of 25 μm is used as the flexible base material 11. It is to be noted that the flexible base material 11 is an insulating base material having flexibility, which may be formed from resin films made of, for example, polyethylene terephthalate (PET) and polyethylene naphthalate (PEN).

(2) Next, as shown in FIG. 3A (2), a plurality of openings 12 are formed in a current collector formation expected region on the flexible base material 11, the openings 12 penetrating through the flexible base material 11 in a thickness direction.

A means for forming the openings 12 is selected, as in the case of forming the openings 5 in the first embodiment, from laser machining with use of lasers such as carbon dioxide lasers and ultraviolet lasers, drilling, punching and the like according to hole diameters, hole pitches and the like. In other cases where the openings 12 are relatively large, the openings 12 may be formed in the flexible base material 11 by a resin etching method using polyimide etching solution and the like.

In the case of using laser machining, desmear treatment is performed after laser machining since the flexible base material 11 may sag by heat during laser machining.

(3) Next, as shown in FIG. 3A (3), a plating resist 13 having an opening 13a in a current collector formation expected region is formed on a front surface and a back surface of the flexible base material 11.

Figure 3B:
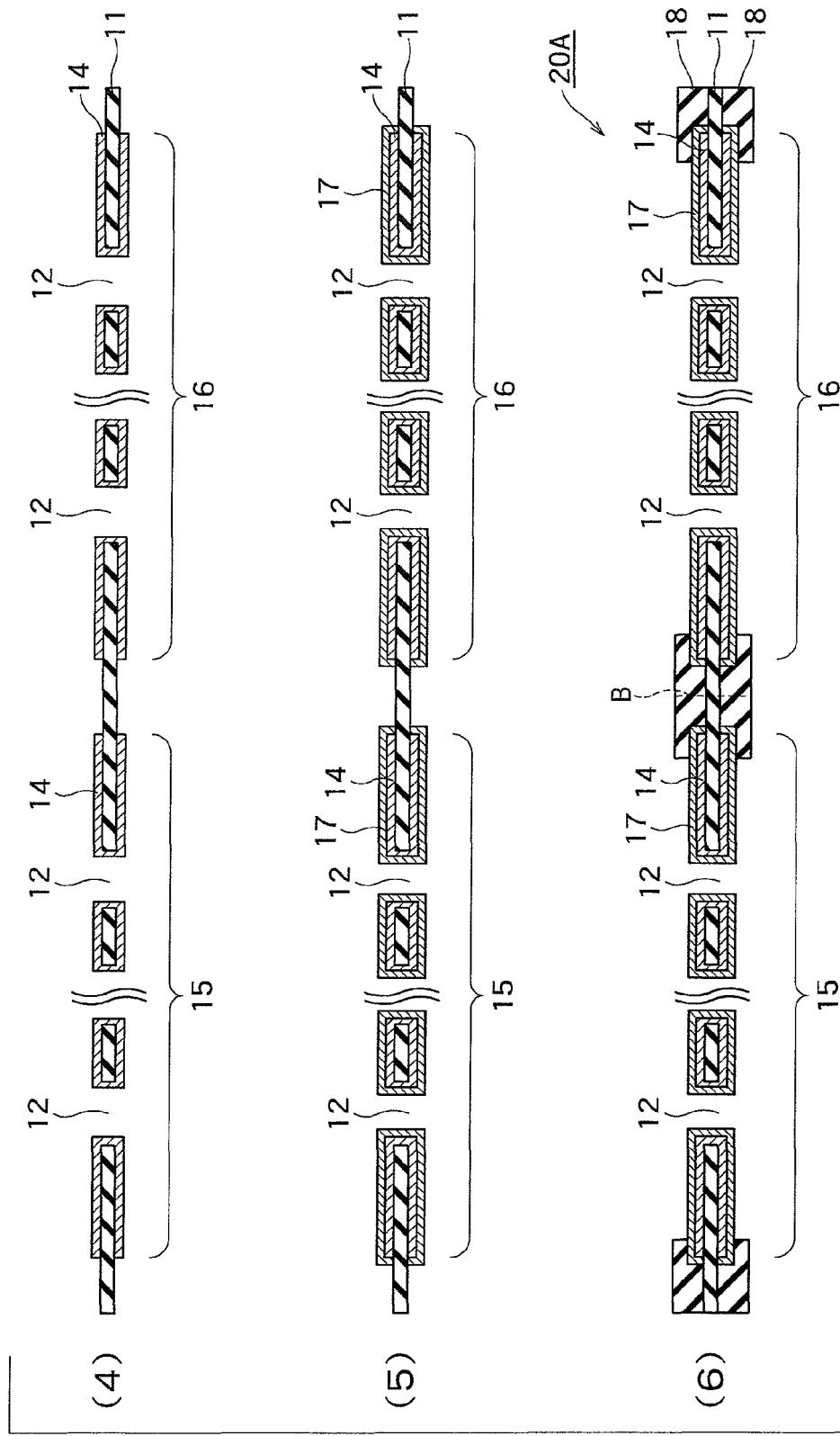
FIG. 3B is a cross sectional process view subsequent to FIG. 3A for explaining the method for manufacturing the flexible circuit board according to the second embodiment of the present invention.

(4) Next, as shown in FIG. 3B (4), plating treatment is applied to the entire surface of the flexible base material 11 having the plating resist 13 formed thereon. As a result, a plating film 14 is formed on top of the flexible base material 11 and on inner walls of a plurality of the openings 12 which are not coated with the plating resist 13.

In this embodiment, electroless copper plating (or electroconductive treatment and the like) followed by electrolytic copper plating treatment are performed to form a 5 μm-thick copper plating film as the plating film 14. It is to be noted that before the electroless copper plating is performed, electroless nickel plating may be performed to form a nickel plating layer (seed layer) on the flexible base material 11. This makes it possible to form a copper plating film with high adhesion strength.

(5) Next, the plating resist 13 is peeled off. Accordingly, as shown in FIG. 3B (4), an anode-side current collector 15 and a cathode-side current collector 16 are formed.

(6) After the plating resist 13 is peeled off, plating treatment is applied to the entire surface of the flexible base material 11, so that a surface treatment film 17 having corrosion resistance higher than that of the plating film 14 is formed on top of the plating film 14 as shown in FIG. 3B (5).

In this embodiment, the plating film 14 is nickel-plated and gold-plated as is the case of the surface treatment film 9 in the first embodiment. As a result, a nickel/gold (Ni/Au) plating film composed of a nickel-plating film with a thickness of 5 μm and a gold plating film with a thickness of 1 μm are formed as the surface treatment film 17. There is no particular restriction on the nickel plating and gold plating methods, and therefore electrolysis plating treatment, electroless plating treatment and the like may be used. Moreover, the surface treatment film 17 may be constituted from the same material as that of the surface treatment film 9.

(7) Next, as shown in FIG. 3B (6), an insulating layer 18 having similar configuration to that of the insulating layer 10 in the first embodiment is formed.

Then, shape processing is performed, and a flexible circuit board 20A according to the second embodiment is obtained. As shown in FIG. 3B (6), in the flexible circuit board 20A as in the flexible circuit board 20 according to the first embodiment, the portions of the current collectors 15 and 16, which come into contact with methanol and acid as an intermediate product thereof, are all coated with the surface treatment film 17, the coated portions including lateral surfaces of the openings that serve as fuel supply ports. According to the second embodiment, therefore, the operation effects similar to those in the first embodiment can be obtained. Further, a thinner flexible circuit board can be obtained.

(Third Embodiment)

Figure 4:
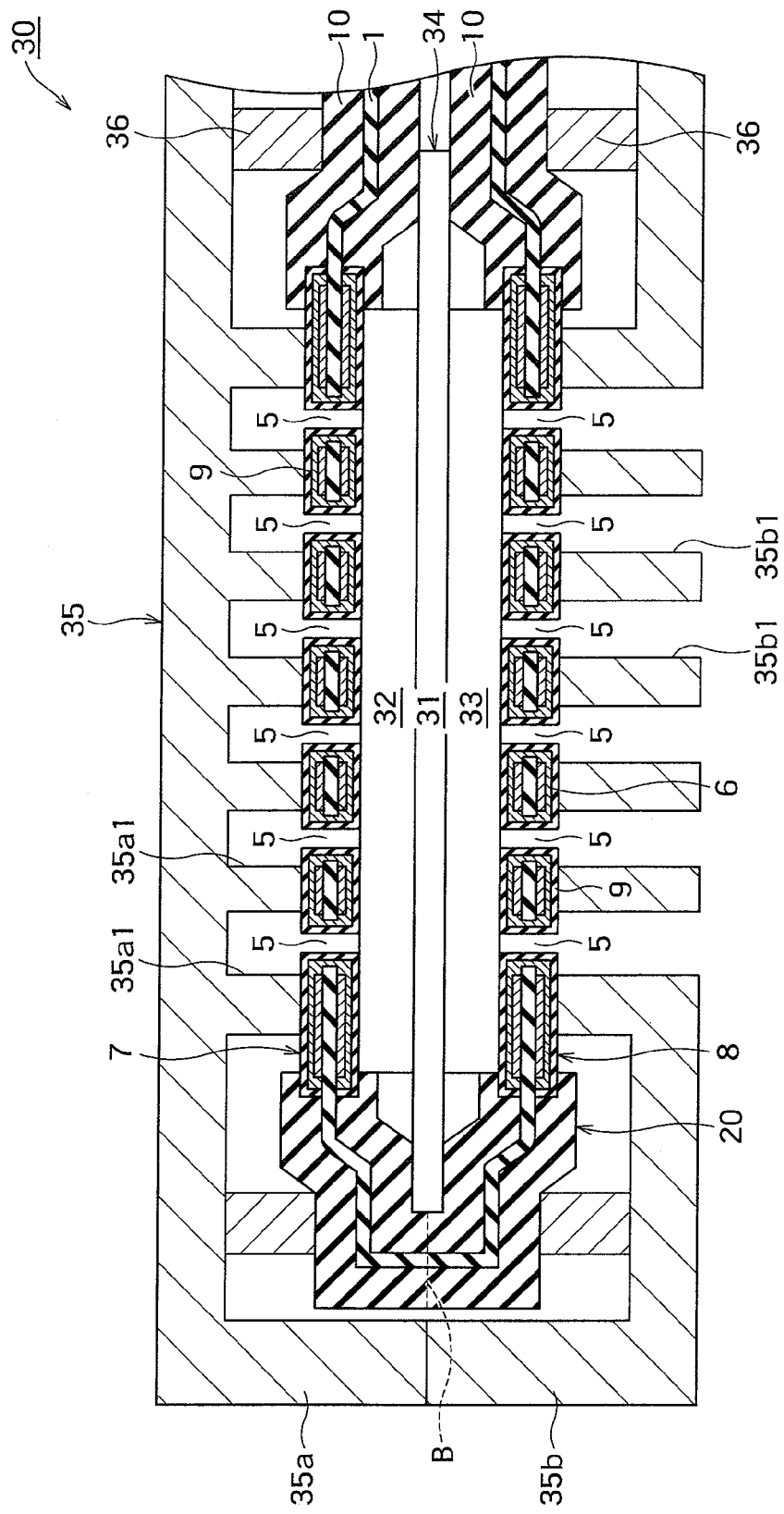
FIG. 4 is a partial cross sectional view showing a configuration example of a fuel cell according to the embodiment of the present invention.

A description is now given of a fuel cell using the flexible circuit board according to the first embodiment. FIG. 4 is a cross sectional view of a part of a fuel cell 30 according to the present embodiment.

As shown in FIG. 4, a fuel cell 30 is a Direct Methanol Fuel Cell (DMFC) including: an MEA 34 constituted of an electrolyte membrane 31, a fuel electrode 32 and an air electrode 33; a flexible circuit board 20 folded along a folding line B for holding the MEA 34 therein; a casing 35; and a sealant 36.

The MEA 34 is constituted of the electrolyte membrane 31, the fuel electrode 32 bonded to one surface of the electrolyte membrane 31, and the air electrode 33 bonded to the other surface of the electrolyte membrane 31.

The flexible circuit board 20 is folded along the folding line B so as to hold the MEA 34 therein in such a way that the current collector 7 is in contact with the fuel electrode 32 and the current collector 8 is in contact with the air electrode 33.

As shown in FIG. 4, the MEA 34 and the flexible circuit board 20 are fixed to the inside of the casing 35. More specifically, as shown in FIG. 4, the casing 35 is constituted of half-casings 35a and 35b, and these half-casings 35a and 35b are assembled into one casing 35 so that the flexible circuit board 20 holding the MEA 34 therein is held in between these half-casings from above and below.

Also as shown in FIG. 4, the half-casing 35a has a plurality of slots 35a1 formed therein for supplying methanol. The half-casing 35b has a plurality of slits 35b1 formed therein for supplying air.

The sealant 36 is provided in an outer peripheral portion of the flexible circuit board 20 folded so as to hold the MEA 34 therein. The sealant 36, which is a frame-like member (such as O rings), is provided in each of the outer peripheral regions of the current collectors 7 and 8 on the flexible circuit board 20 in order to prevent methanol and intermediate products thereof from leaking to the outside.

When the fuel cell 30 is operated to generate power, methanol water solution as fuel is supplied to the fuel electrode 32 through the openings 5 of the current collector 7, while air is supplied to the air electrode 33 through the openings 5 of the current collector 8.

The methanol water solution supplied to the fuel electrode 32 comes into contact with a catalyst of the fuel electrode 32. As a result, the methanol water solution is converted into hydrogen ions and carbon dioxide, and electrons are created as shown by Equation (1) shown below:

$$CH_3OH+H_2O \rightarrow CO_2+6H^++6e^- \qquad (1)$$

The created electrons travel through the current collector 7 of the flexible circuit board 20 and are guided to the outside from the extraction electrode 7a so as to be supplied to electronic equipment. The electrons which operated the electronic equipment are then guided to the current collector 8 via the extraction electrode 8a.

The hydrogen ions, on the other hand, created by Equation (1) pass through the electrolyte membrane 31 and reach the air electrode 33, where the hydrogen ions react with oxygen in the air supplied via the openings 5 of the current collector 8 and with the electrons guided to the current collector 8 as shown in Equation (2). As a result, water is created.

$$3/2O_2+6H^++6e^- \rightarrow 3H_2O \qquad (2)$$

In the fuel cell 30 according to the present embodiment, the metals (copper foils 2, 3 and plating film 6) constituting the current collectors 7 and 8 are coated with the surface treatment film 7 having excellent corrosion resistance without a clearance. Accordingly, even when the fuel cell 30 is exposed to methanol or acid generated by oxidation of methanol, the current collectors 7 and 8 are protected by the surface treatment film 7 from corrosion and elution. As a result, methanol as fuel can stably be decomposed, so that characteristics such as an output voltage can stably be maintained.

Figure 5:
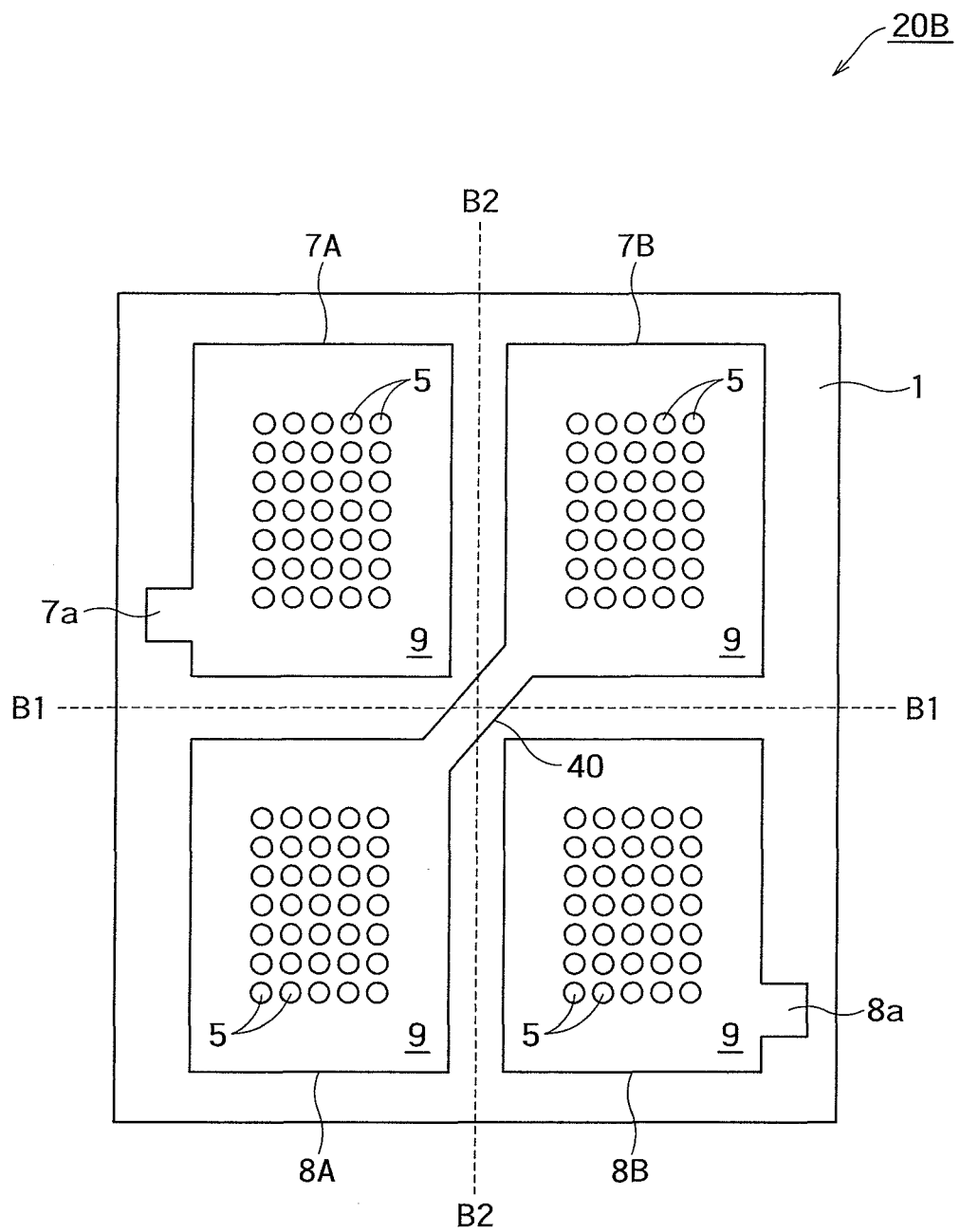
FIG. 5 is a plan view for explaining a flexible circuit board holding two MEAs therein.
Figure 6:
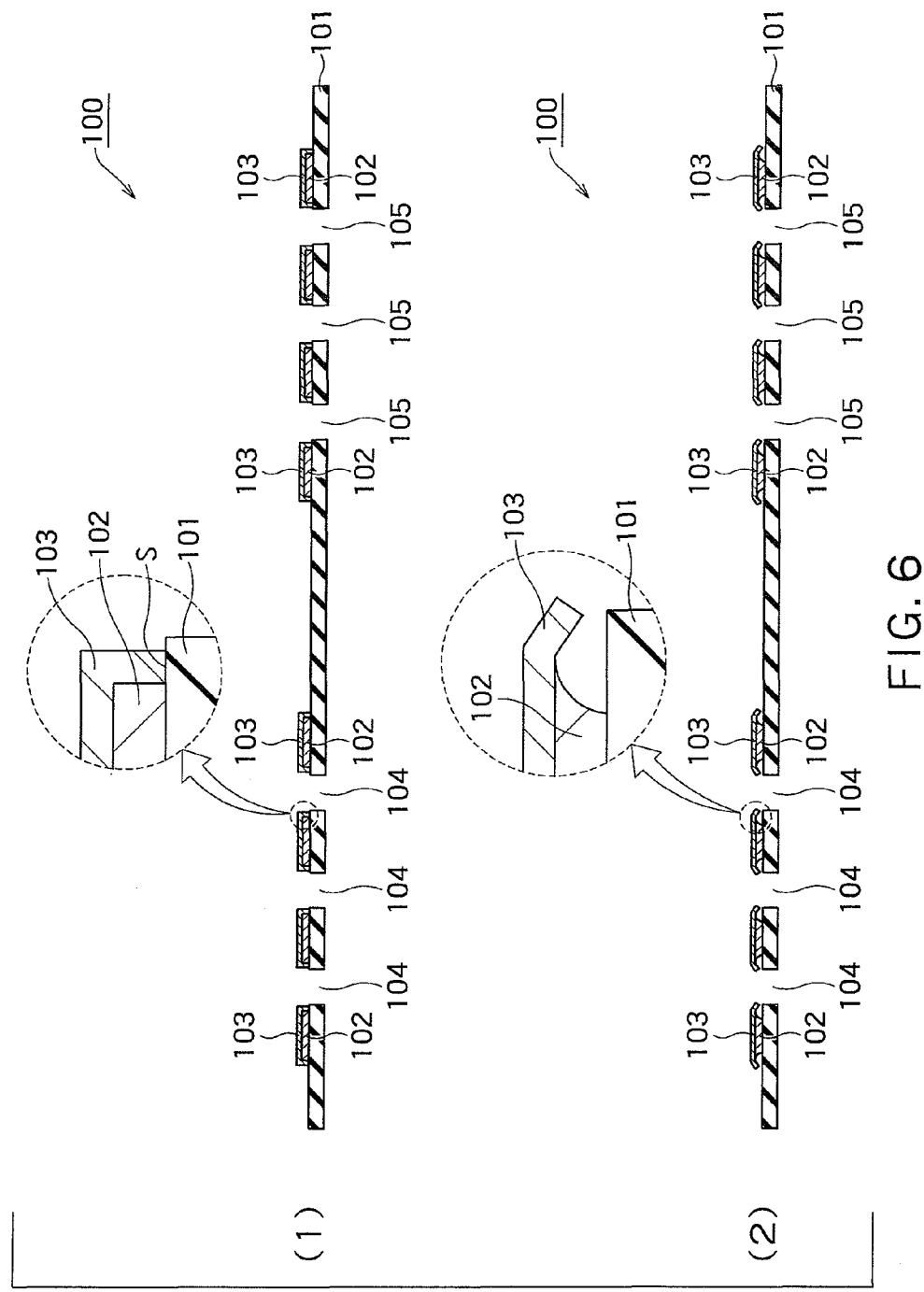
FIG. 6(1) is a cross sectional view of a conventional flexible circuit board for use as a current collecting plate of a fuel cell, while FIG. 6(2) is a cross sectional view showing a conductor layer of the flexible circuit board in the state of being corroded and eluted.

It is to be noted that a stack cell including a plurality of fuel cells connected in series can also be constituted. FIG. 5 shows a plan view of a flexible circuit board 20B according to a modification.

In the flexible circuit board 20B, four current collectors 7A, 7B, 8A, 8B are provided on the flexible base material 1. The current collector 7B and the current collector 8A are electrically connected via a joint portion 40. All of these current collectors 7A, 7B, 8A, 8B are constituted of copper foils 2, 3 and a plating film 6, and their surfaces are coated with the surface treatment film 9 as in the above-mentioned current collectors 7 and 8.

The flexible circuit board 20B is folded along a folding line B1 so that a first MEA (not shown) is held in between the current collector 7A and the current collector 8A while a second MEA (not shown) is held in between the current collector 7B and the current collector 8B. The current collector 7A comes into contact with a fuel electrode of the first MEA, while the current collector 7B comes into contact with a fuel electrode of the second MEA. The current collector 8A comes into contact with an air electrode of the first MEA, while the current collector 8B comes into contact with an air electrode of the second MEA. Accordingly, a fuel cell including two fuel cells connected in series is obtained.

It is to be noted that a fuel cell may also be so constituted that the flexible circuit board 20B is folded along a folding line B2 in FIG. 5. In this case, the current collectors 7A and 8A respectively come into contact with the fuel electrodes of the first and second MEAs, while the current collectors 7B and 8B come into contact with the air electrodes of the first and second MEAs.

Moreover, increasing the number of structures constituted of the current collectors 7B, 8A and the joint portion 40 makes it possible to easily increase the number of fuel cells and to thereby obtain a fuel cell with high voltage.

In the foregoing description, three embodiments according to the present invention were disclosed.

Although the double-sided copper clad laminate and the flexible base material were used as a starting material in the aforementioned embodiments, a single-sided copper clad laminate may also be used as a starting material.

Moreover in the first embodiment (second embodiment), both the current collectors 7 and 8 (current collectors 15 and 16) were formed on the flexible base material, and the flexible base material was folded along the folding line B so as to be used in a fuel cell. However, in the case where an anode-side current collecting plate and a cathode-side current collecting plate are formed as separate entities, only either one of the current collectors may be formed on the flexible base material.

Based on the aforementioned description, those skilled in the art may conceive additional effects and various modifications of the present invention. However, the aspects of the present invention are not limited to the respective embodiments disclosed above. It should be understood that various additions, modifications, and partial deletion of the present invention are possible without departing from the conceptual spirit and meaning of the present invention which are derived from the scope prescribed by the claims and the equivalency thereof.

REFERENCE SIGNS LIST 1, 11 Flexible base material
2, 3 Copper foil
4 Double-sided copper clad laminate
5, 12 Opening 6 Plating film
7, 8, 15, 16 Current collector
7a, 8a Extraction electrode
9, 17 Surface treatment film
10, 18 Insulating layer
10a, 10b, 10c, 10d Opening
13 Plating resist
13a Opening
14 Plating film
20, 20A, 20B Flexible circuit board
30 Fuel cell
31 Electrolyte membrane
32 Fuel electrode
33 Air electrode
34 Membrane Electrode Assembly (MEA)
35 Casing
35a, 35b Half-casing
35a1 Slot
35b1 Slit
36 Sealant
40 Joint portion
100 Flexible circuit board
101 Flexible base material
102 Conductor layer
103 Coating layer
104, 105 Opening
S Interface
C Current collector formation expected region
B Folding line

The invention claimed is:

1. A flexible circuit board having a current collector of a fuel cell provided thereon, comprising:
   an insulating flexible base material;
   a plurality of openings that supply fuel or air, the openings being provided in a specified region so as to penetrate through the flexible base material in a thickness direction;
   a conductor layer that constitutes the current collector, the conductor layer being formed on a front surface and a back surface of the flexible base material in the specified region and on inner walls of the plurality of openings;
   a conductive surface treatment film formed on top of the conductor layer, the conductive surface treatment film having corrosion resistance higher than that of the conductor layer; and
   an insulating layer that covers the surface treatment film in a peripheral edge portion of the current collector across a boundary of the current collector.

2. The flexible circuit board according to claim 1, wherein the conductor layer is made of copper (Cu), and
   the surface treatment film is a plating film made of gold (Au), platinum (Pt), or titanium (Ti).

3. The flexible circuit board according to claim 2, wherein the surface treatment film has a nickel (Ni) plating film as a base.

4. The flexible circuit board according to claim 2, further comprising
   an extraction electrode extending from the current collector along with the flexible base material.

5. A fuel cell comprising:
   a Membrane Electrode Assembly (MEA) constituted of an electrolyte membrane, a fuel electrode bonded to one surface of the electrolyte membrane, and an air electrode bonded to the other surface of the electrolyte membrane; and
   a flexible circuit board according to claim 4, the flexible circuit board being disposed so that the current collector is in contact with the fuel electrode or the air electrode.

6. A fuel cell comprising:
   a Membrane Electrode Assembly (MEA) constituted of an electrolyte membrane, a fuel electrode bonded to one surface of the electrolyte membrane, and an air electrode bonded to the other surface of the electrolyte membrane; and
   a flexible circuit board according to claim 2, the flexible circuit board being disposed so that the current collector is in contact with the fuel electrode or the air electrode.

7. The flexible circuit board according to claim 1, further comprising
   an extraction electrode extending from the current collector along with the flexible base material.

8. A fuel cell comprising:
   a Membrane Electrode Assembly (MEA) constituted of an electrolyte membrane, a fuel electrode bonded to one surface of the electrolyte membrane, and an air electrode bonded to the other surface of the electrolyte membrane; and
   a flexible circuit board according to claim 1, the flexible circuit board being disposed so that the current collector is in contact with the fuel electrode or the air electrode.

* * * * *